Nov. 16, 1965
C. E. LOESCH ETAL
3,217,693
LIVESTOCK FEEDING APPARATUS
Filed Sept. 9, 1963
2 Sheets-Sheet 1
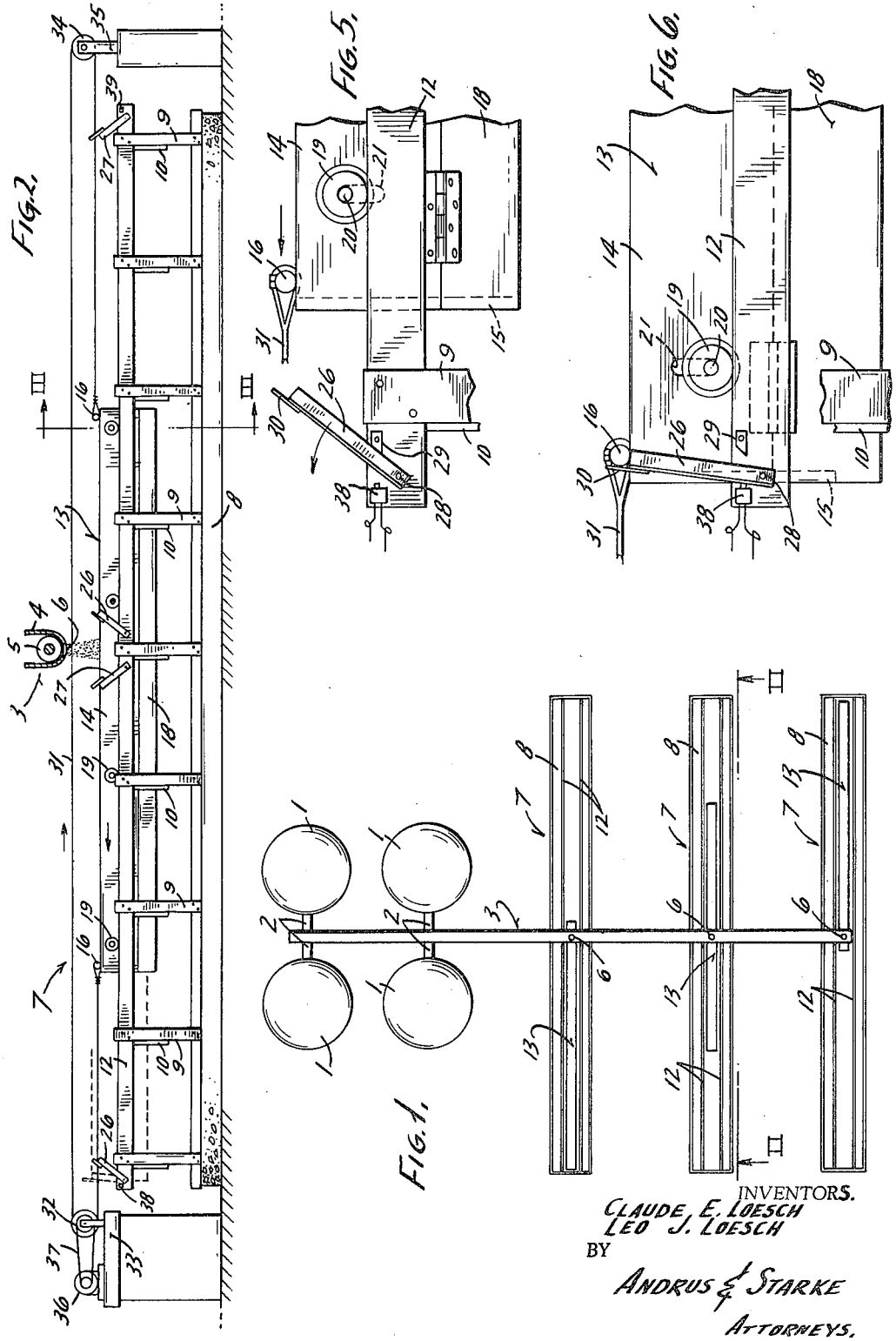
INVENTORS.
CLAUDE E. LOESCH
LEO J. LOESCH
BY
ANDRUS & STARKE
ATTORNEYS.

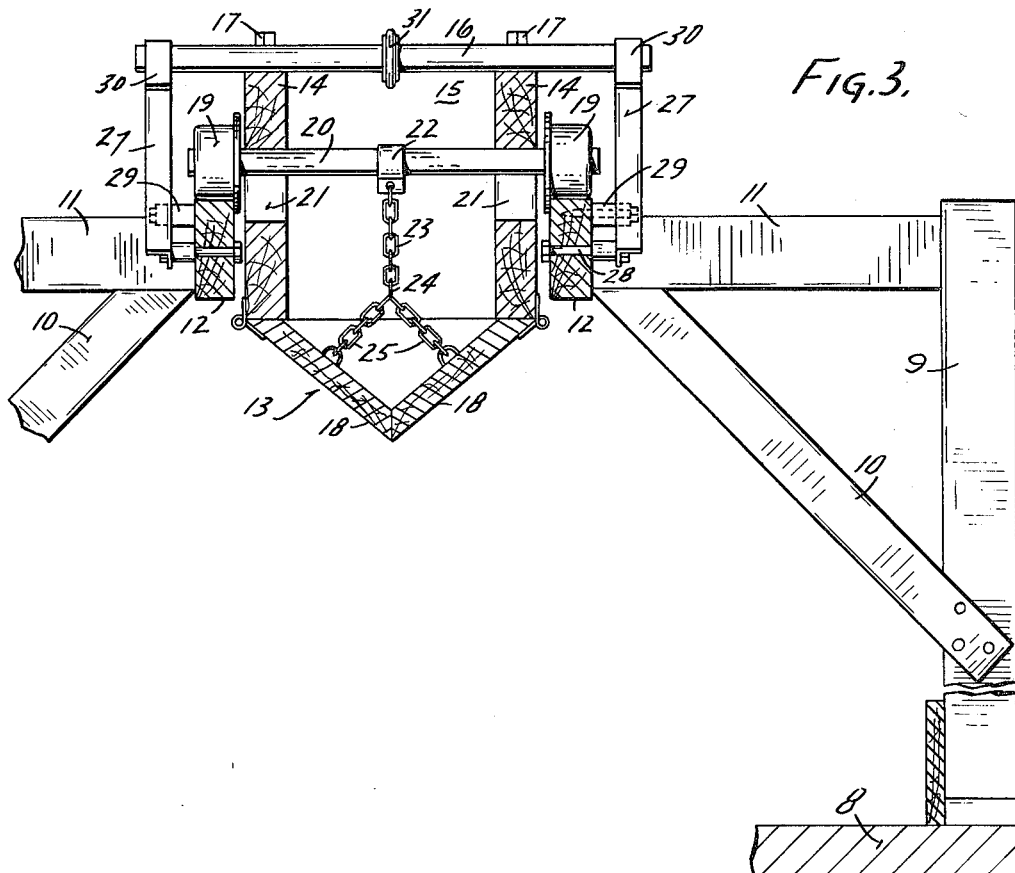
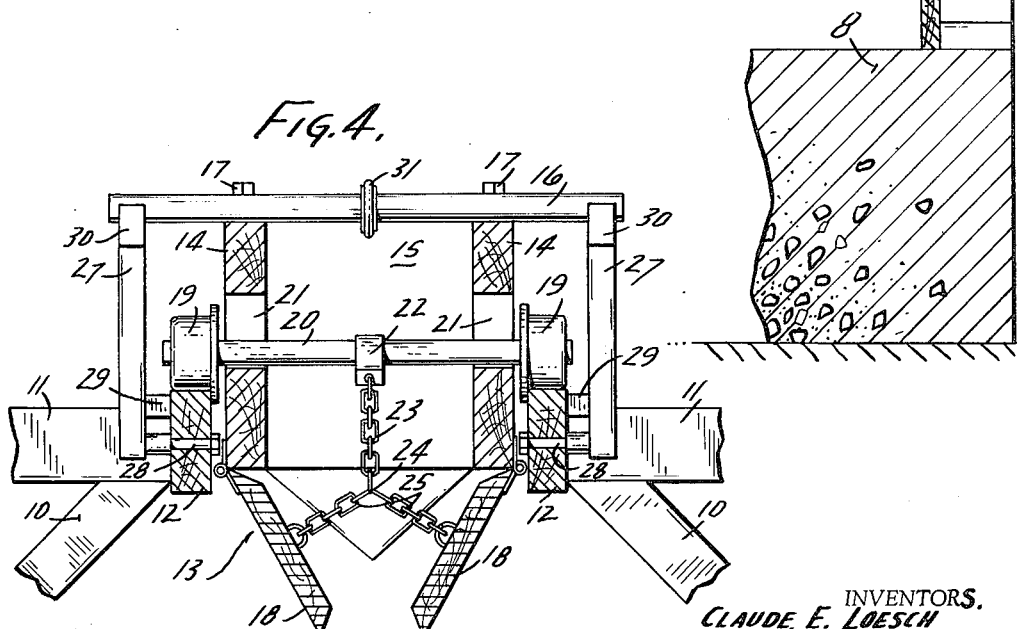

ically discharged through the openings in the conveyor housing to a feed area. In other types of feeders, the conveyor housing is provided with a continuous opening which extends along the bottom of the housing and the feed conveyed by the auger is discharged through the opening onto a board or feed distributing member which is located above the feeding area. When the entire length of the feed distributing member is filled with feed, it is dumped so that the feed is distributed simultaneously along the entire length of the feeding area.

The present invention is directed to an improved livestock feeder which eliminates the use of the conventional auger-type of feeding mechanism and utilizes a movable feed carrier. More specifically, the feeder of the invention includes an elongated feed carrier having an open top to receive feed and having an opening in the bottom closed off by doors or closures. The carrier is mounted for reciprocating movement on a guide track and the carrier has a length approximately equal to one-half the length of the track. A feed supply member is positioned generally at the mid-point of the track above the path of travel of the carrier and feed is continuously discharged from the feed supply member into the carrier as it moves in its reciprocating path of travel. When the carrier reaches an end point of travel, the doors are automatically opened to dump the feed to the feed area and the carrier simultaneously begins its reverse movement in the opposite direction. This reciprocating movement is repeated with the carrier moving back and forth beneath the feed supply member and dumping feed to the feed area when the carrier reaches the end points of its path of travel.

The use of the movable feed carrier eliminates the separation of various types of feed which occurs when using an auger-type of conveying mechanism. In an auger-type feeder the fine material will be discharged through the openings in the auger housing at a location close to the feed supply, while the coarse or rough material will be carried on to the end of the conveyor. With the present invention, using the reciprocating trough carrier, there is no separation of the coarse and fine types of materials and both are uniformly distributed to the feed area.

The feed trough or carrier of the invention is of simple construction having few moving parts and has a very low power requirement. For example, the carrier can be powered by a one-half horsepower motor where an auger-type conveyor of similar capacity would require a three to five horsepower motor.

With the conventional auger-type conveyor, the auger is the same length as the feed bunk. However, with the present invention the feed carrier need only be one-half or less of the length of the entire feed bunk.

The amount of feed distributed to the feed area can be regulated by the number of dumps which are made and also by varying the speed of the drive. As the speed of the carrier is reduced, a proportionately larger amount of feed will be introduced into the carrier, and conversely as the speed of the carrier is increased, the amount of feed introduced into the carrier will be reduced.

Other objects and advantages will appear in the course of the following description.

The drawings illustrate the best mode presently contemplated of carrying out the invention.

In the drawings:

FIG. 1 is a schematic representation of a barnyard installation employing a series of livestock feeders of the invention;

FIG. 2 is a side elevation of a livestock feeder;

FIG. 3 is a transverse section taken along line 3—3 of FIG. 2 and showing the doors in the closed position;

FIG. 4 is a view similar to FIG. 3 showing the doors in the opened position;

FIG. 5 is a fragmentary side elevation showing the lifting arms in the slanted position; and FIG. 6 is a view similar to FIG. 5 showing the lifting arms in the upright position.

FIG. 1 shows a barnyard installation including four silos 1 which are adapted to contain a livestock feed, such as corn silage or grass silage. The feed is conveyed from each of the silos by a conveyor 2 which discharges the feed into a main conveyor 3. The conveyor 3 may be any type of conveyor, such as an auger conveyor, used to convey feed material. As best shown in FIG. 2, the conveyor 3 includes a conveyor housing 4 and an auger 5 which rotates and conveys feed through the housing. The housing 4 is provided with a series of openings 6, each of which is located above a feeding unit 7 so that the feed is continuously discharged through the openings 6 to the feeding units 7.

Each of the feeding units 7 includes an elevated, concrete feed bunk 8, and a series of vertical supports 9 are secured to each side of the bunk and extend upwardly from the bunk. Braces 10 and 11 are secured to each of the supports 9 and carry a generally horizontal guide rail or track 12.

An elongated feed carrier 13 is supported for reciprocating movement on the guide rails 12 and the carrier has a length approximately equal to one-half of the length of the guide rails.

The carrier 13 includes a pair of side walls 14 and a pair of end walls 15 which connect the side walls together. The side walls 14 are also tied together by a pair of rods 16 which are connected to the upper edges of the side walls 14 by screws 17.

The top of the carrier 13 is open and is adapted to receive feed being discharged through the opening 6 in the main conveyor 3 as the carrier travels along the guide rails 12. The lower end of the carrier 13 is closed off by a pair of doors 18 which are hinged to the lower edges of the side walls 14.

The carrier 13 is mounted for movement on the guide rails 12 by a series of rollers 19 which are journalled on shafts 20 which extend transversely of the carrier 13 through vertical slots 21 formed in the side walls 14. The central portion of the shaft 20 carries a bracket 22 and a chain 23 extends downwardly from the bracket and is attached to a connecting ring 24. Chains 25 are attached between the connecting ring 24 and the doors 18.

As the rollers 19 ride on the upper surface of the guide rails 12 as the carrier is moved along the feed bunk 8, shafts 20 are located in the upper ends of the slots 21 so that the weight of the carrier 13 rests on the shafts and the doors are in the closed position, as shown in FIG. 3. When the carrier reaches the end points in its path of travel, the carrier is moved upwardly with respect to the shafts 20 so that the shafts will be located in the lower portion of the slots 21 and the doors 18 will then fall by gravity to the open position, as shown in FIG. 4.

To open the doors 18 when the carrier reaches the end points in its path of travel, arms 26 and 27 are pivotally connected by studs 28 to the guide rails 12. As shown in FIG. 2, there are two pairs of arms 26, with one pair of arms 26 being located at one end of the guide rails and the other pair of arms 26 being located adjacent the mid-point of the guide rails. Similarly, there are two pairs of arms 27, with one pair being at the opposite end of the rails 12 and the other pair of arms 27 being adjacent the mid-point of the guide rails.

Each of the arms 26 and 27 is normally maintained in a slanted or tilted position with respect to the vertical by a stop 29 secured to the respective rail 12. In addition, each of the arms 26 and 27 is provided with an extension 30 which projects upwardly beyond the end of the arm.

As the carrier moves to the left, as shown in FIG. 2, and approaches the end point in its path of travel, the rods 16 engage the extensions 30 on the arms 26 to pivot the arms to a generally vertical position and elevate the carrier 13 with respect to the tracks 12, thereby causing the doors 18 to open by gravity.

To drive the carrier in its reciprocating path of travel, an endless cable 31 is attached to the rods 16 at each end of the carrier. The cable 31 is wound around a drum 32 mounted for rotation on a platform 33 located at one end of the feed bunk and the cable is also trained around a sheave 34 journalled within a supporting structure 35 located at the other side of the feed bunk. A motor 36 is mounted on platform 33 adjacent the drum 32 and acts through belt drive 37 to drive the drum and thereby move the carrier along the guide rails 12. The motor is preferably a reversible, variable speed motor which is adapted to be reversed when the carrier reaches the end points in its path of travel. However, it is contemplated that any type of conventional drive mechanism can be employed to reciprocate the carrier 13.

The direction of travel of the carrier is reversed by limit switches 38 and 39 which are mounted near the ends of the guide rails 12 adjacent the arms 26 and 27, respectively. As the carrier 13 moves to the left, as shown in FIG. 2, and the arms 26 are pivoted upwardly, one of the arms will actuate the limit switch 38 which acts through a conventional latching relay mechanism to reverse the direction of the motor 36 so that the carrier moves in the opposite direction. As the carrier moves in the opposite direction, to the right in FIG. 2, the arms 26 will fall by gravity to their slanted position and rest against the stops 29.

In operation of the feeder, the feed is initially discharged from the silos 1, conveyed through the main conveyor 3, and is discharged through the openings 6 of the conveyor 3 into the carriers 13 which are moving along the guide tracks 12. The feed is continuously discharged through the openings 6 and is introduced along the length of the carrier as the carrier moves in its path of travel.

As the carrier approaches the end point of its path of travel, the rods 16 engage the arms 26 to tilt the arms upwardly and thereby raise the carrier 13 so that the doors 18 will open. The feed, which is distributed along the entire length of the carrier, will be dumped onto one-half of the feed bunk 8. Simultaneously, the arm 26 will actuate the limit switch 38 to thereby reverse the motor so that the carrier will then move in the opposite direction. As the carrier moves in the opposite direction, the feed being discharged from the conveyor 3 will be distributed throughout the length of the carrier as it moves to the opposite end of the feed bunk. As the carrier 13 approaches the opposite end of its path of travel, the rods 16 will engage the arms 27 to again elevate the carrier and open the doors 18 so that the feed will be dumped from the entire length of the carrier onto the feed bunk 8. Simultaneously, the arms 27 will engage limit switch 39 to reverse motor 36 and move the carrier in the opposite direction.

The carrier 13 preferably has a length approximately equal to one-half the length of the path of travel of the carrier. As shown in FIG. 1, the carriers 13 have a length slightly less than one-half of the length of the guide rails 12 so that when the carriers are at the end point of their path of travel, the carrier will not be positioned under the conveyor 3. This means that the feed being discharged through the openings 6 in conveyor 3 will fall directly onto the feed bunk 8. This situation exists for only very short intervals until the carrier begins its reverse travel and will insure that the area directly beneath the conveyor receives the desired amount of feed.

As shown in FIG. 1, three feed units 7 are employed. However, it is contemplated that one or more feed units may be used depending upon the size of the feed area and the number of livestock to be fed.

Similarly, while the drawings illustrate the feed units 7 as being straight in shape, and the carriers 13 moving in a reciprocating path, it is contemplated that the guide tracks 12 could be circular or other shape and the carriers 13 would have a corresponding shape.

Any type of feed supply member can be used to supply feed to the carrier 13. For example, a hopper, chute, elevator or the like can be used in place of conveyor 3. Feed can be discharged directly from a storage structure or silo to the feed supply member, or as shown in the drawings, the feed can be conveyed through a conveying system before entering the feed supply member.

As the feed is merely dumped into the carrier 13, there is no mechanical agitation of the feed within the carrier 13. Thus, the rough and fine materials of the feed will not be separated, as in the case of an auger-type feeder. This results in a uniform distribution of the various types of feed throughout the entire length of the feed bunk.

As the feed itself is not being conveyed, but instead the feed trough is moved, the frictional resistance is substantially reduced and substantially lower power requirements are needed for a given feeding capacity.

The amount of feed to be distributed to the feed bunk can be regulated, either by the number of dumps which are made, or by varying the speed of travel of the carrier. In some situations it may be desired to dump the feed only at one end of the feed bunk, and in this case the door opening mechanism at one end would be removed or deactivated so that the doors would only open at one end. This would result in the trough receiving a double load of feed between dumpings.

Various modes of carrying out the invention are contemplated as being within the scope of the following claims particularly pointing out and distinctly claiming the subject matter which is regarded as the invention.

We claim:

1. A livestock feeding apparatus, comprising a feeding area, a guide track disposed above the feeding area, a carrier mounted for movement on the guide track and having an opening extending substantially the length of the carrier for receiving feed, drive means for moving the carrier in a path of travel on said track, fixed feed supply means located above the path of travel of said carrier for continuously discharging feed into the opening in said carrier, and means for automatically dumping the feed from the carrier to the feeding area at a given location on said path of travel.

2. A livestock feeding apparatus, comprising a feeding area, a guide track, an elongated carrier disposed above the feeding area and mounted for movement on the guide track and having an inlet opening extending substantially the length of the carrier for receiving feed, drive means for moving the carrier in a path of travel on said track, fixed feed supply means located above the path of travel of said carrier and disposed approximately at the mid-point of said track for continuously discharging feed into said carrier as the carrier moves in said path of travel, and means for automatically dumping the feed from the carrier to the feeding area at a given location on said path of travel.

3. A livestock feeding apparatus, comprising a feed bunk, a guide track located above the feed bunk, an elongated carrier mounted for movement on said guide track, said carrier having an open top to receive feed and having a discharge opening in the bottom extending substantially the entire length of said carrier, drive means for moving the carrier in a path of travel on said guide track, closure means for closing the discharge opening in said carrier, fixed feed supply means located above the path of travel of the carrier for continuously discharging feed into the open top of said carrier, and means operably connected to said closure means for automatically opening said closure means to dump the feed from said carrier to the feed bunk at a given location during the travel of said carrier.

4. A livestock feeding apparatus, comprising a feed bunk, a guide track, an elongated carrier disposed above the feed bunk, and mounted for movement on the guide track and having an inlet opening extending substantially the length of the carrier for receiving feed, said guide track disposed at a level above the bottom surface of the carrier, drive means for continuously moving the carrier in a reciprocating path of travel on said track, fixed feed supply means located above the path of travel of said carrier and disposed approximately at the mid-point of said track for continuously discharging feed into said carrier as the carrier moves in said path of travel, means responsive to the carrier approaching an end point in said path of travel for dumping said feed from the carrier to the feed bunk, and means responsive to the carrier reaching said end point for reversing said drive means, to move the carrier in the opposite direction on aaid track.

5. A livestock feeding apparatus, comprising a guide track, an elongated carrier mounted for movement on said guide track, said carrier having an open top to receive feed and having a discharge opening in the bottom extending substantially the entire length of said carrier, reversible drive means for moving the carrier in a reciprocating path of travel on said guide track, closure means for closing the discharge opening in said carrier, fixed feed supply means located above the path of travel of the carrier for continuously discharging feed into the open top of said carrier, means operably connected to said closure means for automatically opening said closure means to dump the feed from said carrier when the carrier reaches an end point in its reciprocating path of travel, and means operably connected to said closure means for automatically closing said closure means as the carrier begins to move in the opposite direction from said end point.

6. A livestock feeding apparatus comprising a feed bunk, a guide track spaced above the feed bunk and extending along the length of said feed bunk, an elongated carrier mounted for movement on the guide track and having an inlet opening extending substantially the length of the carrier for receiving feed, said carrier having a length equal to approximately one-half the length of said track, reversible drive means for moving the carrier in a reciprocating path of travel on said track above said feed bunk, feed supply means located above the path of travel of said carrier and having a discharge opening for discharging feed into said carrier as the carrier moves in said reciprocating path of travel, and means responsive to the carrier reaching a point immediately adjacent each end in said path of travel for releasing the feed into said feed bunk.

7. A livestock feeding apparatus, comprising a feeding area, a guide track, an elongated carrier disposed above the feeding area and mounted for movement on said guide track, said carrier having an open top to receive feed and having a discharge opening in the bottom extending substantially the entire length of said carrier, reversible drive means for moving the carrier in a reciprocating path of travel on said guide track, closure means for closing the discharge opening in said carrier, fixed supply means located above the path of travel of the carrier for continuously discharging feed into the open top of said carrier, an actuating member located at a given position along said path of travel, operating means operably connected to said closure means and disposed to engage said actuating member as said carrier approaches an end point in said path of travel for opening said closure means and releasing said feed from the entire length of said carrier to the feeding area, and means for reversing the drive means after the feed has been released from the carrier.

8. A livestock feeding apparatus, comprising a feed bunk, a guide track spaced above the feed bunk and extending along the length of said feed bunk, an elongated carrier having an open top and including a pair of spaced side walls with the lower ends of the side walls defining a discharge opening extending substantially the length of said carrier, a door hinged to each side wall and extending the length of said carrier, said doors being movable from a closed position closing off said discharge opening to an open position, a series of rollers disposed to ride on said track, a shaft connected to each roller and extending through a vertical slot in a side wall of said carrier, connecting means disposed within the carrier for connecting said shaft and said doors, drive means for moving the carrier in a reciprocating path of travel on said track, fixed feed supply means located above the path of travel of said carrier and disposed approximately at the mid-point of said track for continuously discharging feed into said carrier as the carrier moves in said path of travel, and means for elevating said side walls of the carrier with respect to the shafts and track when the carrier reaches an end point in its path of travel to thereby permit said doors to pivot by gravity to the open position to dump the feed in the carrier onto said feed bunk.

9. The structure of claim 2 in which said drive means includes an endless member connected to the carrier, a rotatable drum located at one end of said track with said endless member being reeved above the drum, a rotatable support member located at the other end of the drum for supporting the endless member in movement, and a reversible driving member connected to the drum for rotating the drum and moving said endless member.

10. The structure of claim 7 in which the closure means comprises a pair of doors pivotally connected to the carrier for closing said discharge opening.

References Cited by the Examiner
UNITED STATES PATENTS

| | | | |
|---|---|---|---|
| 2,536,621 | 1/1951 | Arnold | 119—21 |
| 2,987,038 | 6/1961 | Cole | 119—18 |

FOREIGN PATENTS

| | | |
|---|---|---|
| 281,734 | 1/1915 | Germany. |

SAMUEL KOREN, *Primary Examiner*,

HUGH R. CHAMBLEE, *Examiner*.